United States Patent [19]
Topping et al.

[11] Patent Number: 5,751,835
[45] Date of Patent: May 12, 1998

[54] METHOD AND APPARATUS FOR THE AUTOMATED IDENTIFICATION OF INDIVIDUALS BY THE NAIL BEDS OF THEIR FINGERNAILS

[76] Inventors: Allen Topping, 44 Delmar St., San Francisco, Calif. 94117; Vladimir Kuperschmidt, 3124 Weymouth Ct., Pleasanton, Calif. 94588; Austin Gormley, 906 20 Ave. N., North Myrtle Beach, S.C. 29582

[21] Appl. No.: 538,918

[22] Filed: Oct. 4, 1995

[51] Int. Cl.$^6$ ........................................... G06K 9/00
[52] U.S. Cl. ..................... 382/115; 356/71; 340/825.34
[58] Field of Search ........................... 382/115, 116, 382/117, 124–127; 340/825.34; 356/71; 283/68, 69, 70; 250/227.26, 227.28

[56] References Cited

U.S. PATENT DOCUMENTS

| | | | |
|---|---|---|---|
| 4,236,082 | 11/1980 | Butler | 382/115 |
| 4,614,366 | 9/1986 | North | 283/70 |
| 4,785,171 | 11/1988 | Dowling | 250/227 |
| 4,856,891 | 8/1989 | Pflibsen et al. | 351/210 |
| 4,881,268 | 11/1989 | Uchida et al. | 382/135 |
| 5,359,669 | 10/1994 | Shanley et al. | 382/117 |

*Primary Examiner*—Christopher S. Kelley

[57] ABSTRACT

A system for encoding and recognizing individuals by the unique characteristics of their fingernails or other body part employs a master oscillator (430) which controls a plurality of monochromatic light sources (400) and (410). The light beams are coupled to an acousto-optic, 2-D beam deflector (500) which selectively illuminates individual input port fibers (530). The light beams then pass through sensing ports (520) and enter the individual's skin or a fingernail. Light reflected from the individual's body part then enters sensing ports (520) and exits through output ports (540). Output ports (540) are optically coupled to a CCD sensor (450) which detects the amplitudes of light reflected from the subject's fingernail, for example. The output of sensor (450) is connected to an analog-to-digital converter (460), which in turn presents a digital representation of the intensity of the reflected light to a computer (470). This system measures the spacing of capillary loops (355) which are separated by valleys (362) in the nail bed (500) of fingernail (300). The spacings of loops (355) are unique to each individual, much as fingerprints are unique. Detection of loops (355) and determination of their spacings is accomplished through the use of two different wavelengths of light, one of which is strongly absorbed and the other of which is strongly scattered by blood which perfuses nail bed (500). After data analysis and correction, a simple binary representation of the relative positions of loops (355) is obtained, providing a positive, unique, and readily obtained identification of an individual subject.

18 Claims, 6 Drawing Sheets

SUBJECT A
FIG. 11A

SUBJECT B
FIG. 11B

METHOD AND APPARATUS FOR THE AUTOMATED IDENTIFICATION OF INDIVIDUALS BY THE NAIL BEDS OF THEIR FINGERNAILS

BACKGROUND—FIELD OF INVENTION

This invention relates to human identification technology, particularly to a method and apparatus for producing identifying data unique to a person through examination and characterization of the person's fingernail bed or other distinguishing anatomical part.

BACKGROUND—PRIOR ART—GENERALLY ACCEPTED IDENTIFICATION SCHEMES

Prior-art personnel identification schemes rely on pictorial recognition, voice printing, fingerprinting, DNA fingerprinting, and retinal scanning, among others. In general there are many means which measure unique physical properties of the person or environmental tracings created by the person. Each means, however, has one or more drawbacks or disadvantages.

PRIOR ART—FIG. 1—PICTORIAL RECOGNITION

Pictorial recognition is easily accomplished by human beings. Recognition of one person by another does not provide a practical solution to the problem of identifying people at large. It can also be accomplished by computers; however computer recognition generally takes longer and is less reliable. A computerized recognition scheme is shown schematically in FIG. 1. A scanning means or camera 10 is used to enter pictorial data 20, usually the subject's face, into computer 30. Recognition algorithms (not shown) are then used to identify the face.

While it has been demonstrated to work in some cases, recognition of faces by a computer is not generally adequate for use in a foolproof identification system. Computer recognition of a face can take some time and requires relatively large amounts of data; hence it may be inappropriate for use in mass screenings. Furthermore, both of these methods can fail if a person changes her or his appearance through the use of makeup, hair coloring, hair styling, accident, surgery, and so forth.

PRIOR ART—FIG. 2—VOICE RECOGNITION

Voice recognition is also easily accomplished by human beings. It can be accomplished by computers; however again it generally takes longer and is less reliable. A computerized voice recognition scheme is shown schematically in FIG. 2. In this case, a microphone 40 is used to enter voice data represented by sound waves 50, and emanating from subject 45, into computer 60. Speech recognition algorithms (not shown) are then used to decipher the speech and match its attributes to one particular speaker.

Voice recognition is presently an inexact science. The algorithms in use today can generally recognize only a relatively few words. This method is unsuitable for mass screening and identification of individuals.

PRIOR ART—FIGS. 3 AND 4—FINGERPRINTS

Identification through the use of real or latent (normally invisible fingerprint tracings left on surfaces by body oils, sweat, etc.) fingerprints is now accomplished with ease by both computers and humans.

REAL TIME FINGERPRINTING—DATA INPUT

Figure 3:
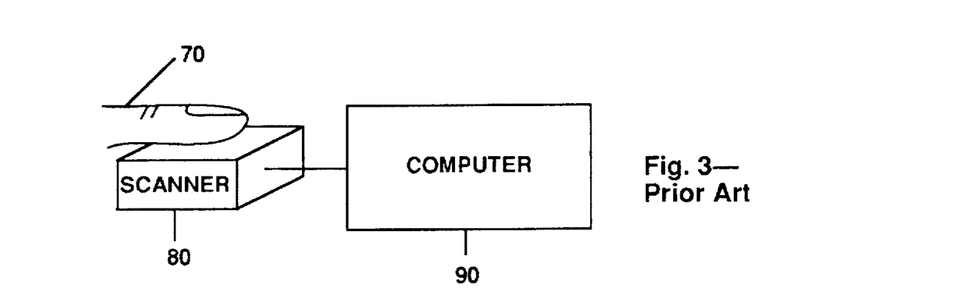
FIG. 3. is a diagram of a prior-art humanly sensible, fingerprint identification system.

Real-time fingerprinting of large numbers of individuals is accomplished by automatic scanners in combination with computers. In FIG. 3 a finger 70 is placed in contact with the surface of a scanner 80. Scanner 80 contains a light source (not shown) and photodetector means (not shown) which obtain an image of the subject's fingerprint. Data from scanner 80 are fed to computer 90 for analysis and identification by algorithms (not shown). U.S. Pat. No. 3,864,042 to Leventhal et al. teaches a method of illuminating the surface of a finger and producing an output that is indicative of the fingerprint of an individual. This method requires interpretation and storage of relatively large amounts of data. Also, it carries the stigma of fingerprinting for law enforcement.

ANALYSIS OF LATENT FINGERPRINTS

Computerized analysis of latent fingerprints is accomplished by dusting the fingerprint tracing with a finely divided powder to make it visible, photographing the print, then scanning the photograph. The scanning process is shown schematically in FIG. 4. A photograph 100 of fingerprint 110 is positioned in front of a camera or scanner 120. Scanner 120 then provides a digitized image of print 110 to a computer 150 for analysis. A fingerprint recognition algorithm (not shown) is used to decipher the familiar loops and whorls contained in the fingerprint. The resulting information can be compared with a database of fingerprints of personnel on file for identification of the person who created the print.

Fingerprints have been used successfully for decades as a means for identifying individuals. Computerized databases have been created and algorithms have been refined so that they can identify an individual through a relatively quick study of the characteristics of the print. Large numbers of fingerprints can be catalogued and accessed quickly. However this means of identification carries the stigma associated with criminals and law enforcement. Furthermore, the analysis involves a two-dimensional study of the individual's print. This study requires and generates moderate amounts of data which must be catalogued and stored.

PRIOR ART—FIG. 5—DNA "FINGERPRINTING"

The term "fingerprinting" in the DNA context is meant to signify a means for identifying individuals through an analysis of their genetic structure. Minute amounts of blood, semen, hair, or body tissues can be used to uniquely identify an individual. The process of DNA fingerprinting is shown diagrammatically in FIG. 5. In this process, a sample 160 of an individual's body tissue or certain fluids is subjected to chemical manipulation, shown schematically as 170. The sample's constituent amino acids are then separated by electrophoresis (separation by an electric field in a viscous fluid) in gel 180. The resulting separation is scanned by scanner 190 and the results analyzed by algorithms (not shown) contained in computer 200. Comparison of electropherograms (traces produced by electrophoresis) can be used to provide positive or negative identification of individuals.

DNA fingerprinting requires intensive laboratory work over a period of days. This method of identification is slow and expensive and so is useful only in certain cases where comparisons are made between only a few individuals. This method is presently not useful for mass screening of individual identities.

PRIOR ART—FIG. 6—RETINAL SCANS

Figure 6:
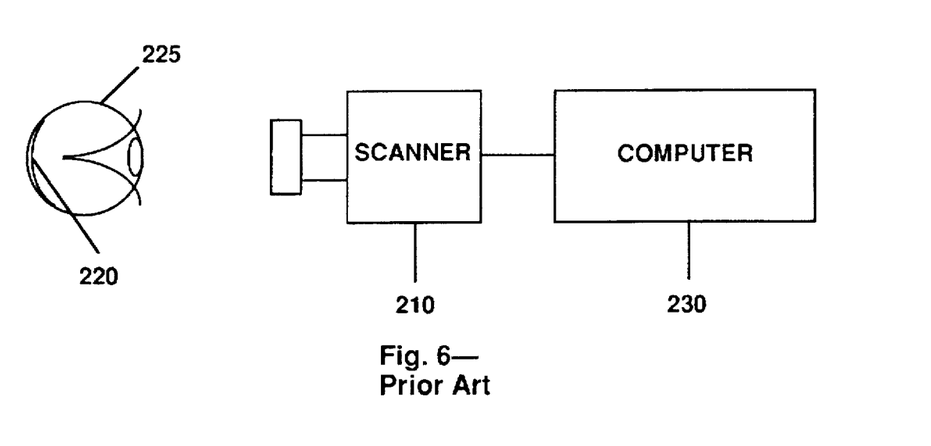
FIG. 6 is a schematic diagram of a prior-art, computerized retinal scanning system used in personnel recognition.

Retinal scans involve the scanning or photographing for later scanning of a person's retina. The distribution of blood vessels and various other anatomical structures in an individual's eye is sufficiently complex and unique to permit identification of individuals by comparing the structure of one person's retina with that of another. Retinal scans are accomplished as shown in FIG. 6. Scanner 210 digitizes the image of a retina 220 in an eye 225. The image is sent to a computer 230 for analysis by a retinal recognition algorithm (not shown). However this procedure is too cumbersome and intrusive for mass screening and identification of individuals.

OBJECTS AND ADVANTAGES

Accordingly, several objects and advantages of the present invention are to provide an improved method and apparatus for rapid identification of individuals. Other objects are to provide a means for identifying individuals which is inexpensive, which does not carry the social stigma of law enforcement, which does not require the storage or manipulation of vast amounts of data, and which is neither cumbersome nor intrusive. Other objects are to provide a means for identification of individuals which is computerized and can yield unambiguous results, and which automatically analyzes fingernail beds.

Additional objects and advantages will become apparent from a consideration of the drawings and ensuing description thereof.

SUMMARY

In accordance with the present invention, a method and apparatus are provided which uses a plurality of different light sources to selectively illuminate successive discrete portions of an individual such as fingernails, detect reflected light from this illumination with photodetectors, analyze this detected light, and present results indicative of the identity of the individual.

BRIEF DESCRIPTION OF THE DRAWINGS

FIG. 9c shows a binary representation of the location of loops 360", which are depicted in FIG. 9a.

DRAWING FIGURE REFERENCE NUMBERALS

Figure 1:
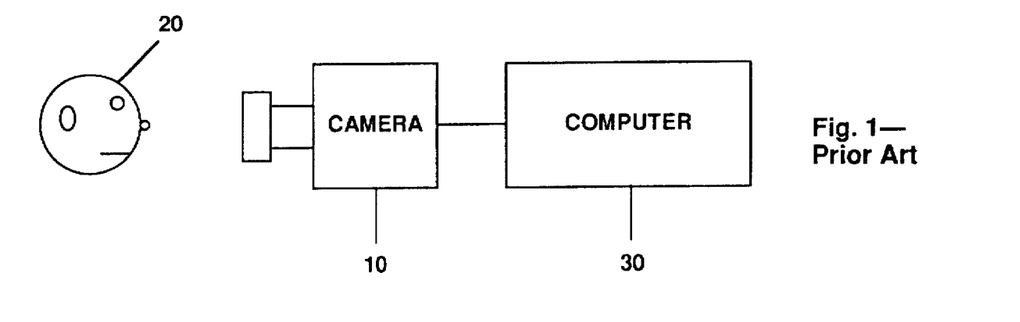
FIG. 1 is a schematic diagram of a prior-art, computerized human facial recognition system.
Figure 2:
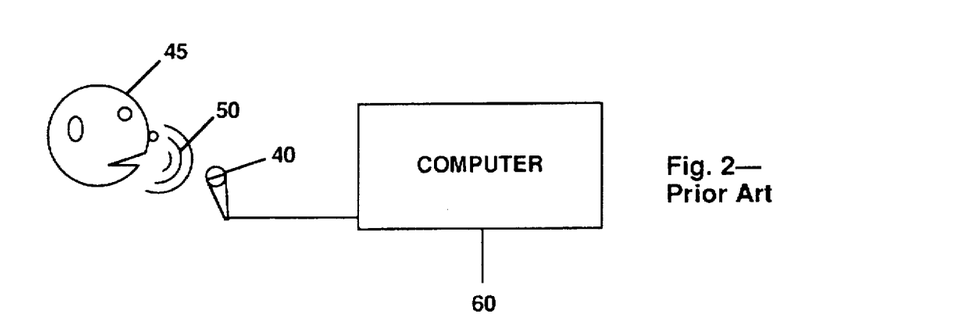
FIG. 2 is a schematic diagram of a prior-art, computerized human voice recognition system.
Figure 4:
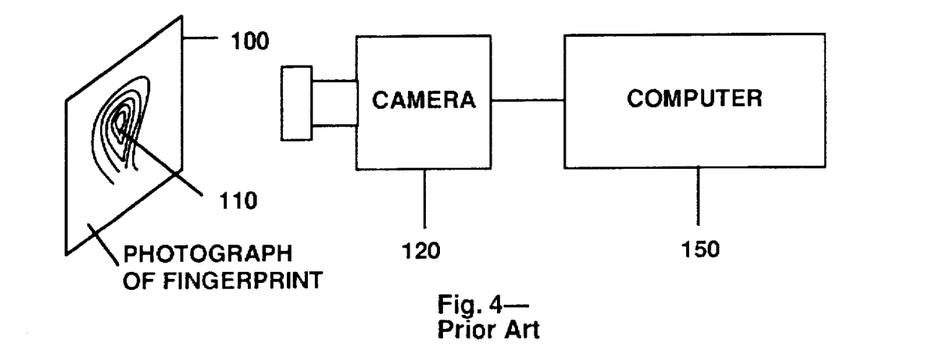
FIG. 4 is a schematic diagram of a prior-art, computerized fingerprint recognition system.
Figure 5:
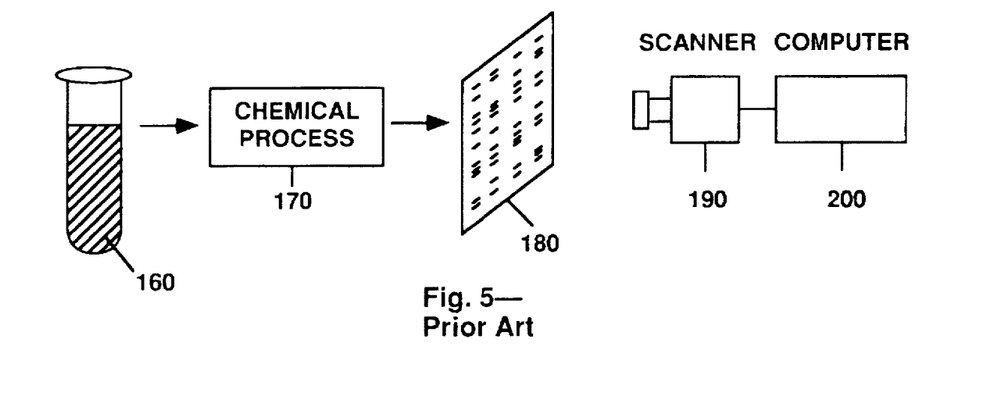
FIG. 5 is a block diagram showing some of the steps required in prior-art DNA "fingerprint" analysis.
Figure 7A:
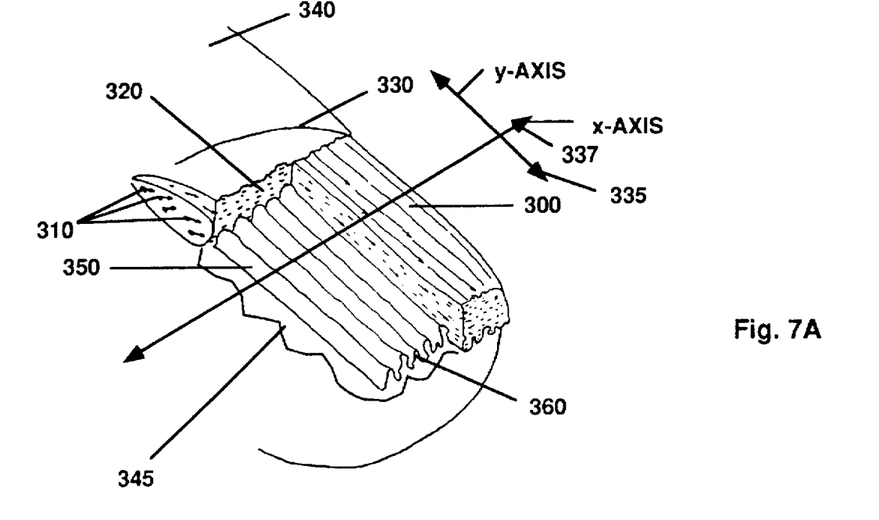
FIGS. 7A and 7B are drawings of a human fingernail showing a cut-away view of a fingernail nail, the nail bed, and an enlarged section of the structure of the nail bed.
Figure 7B:
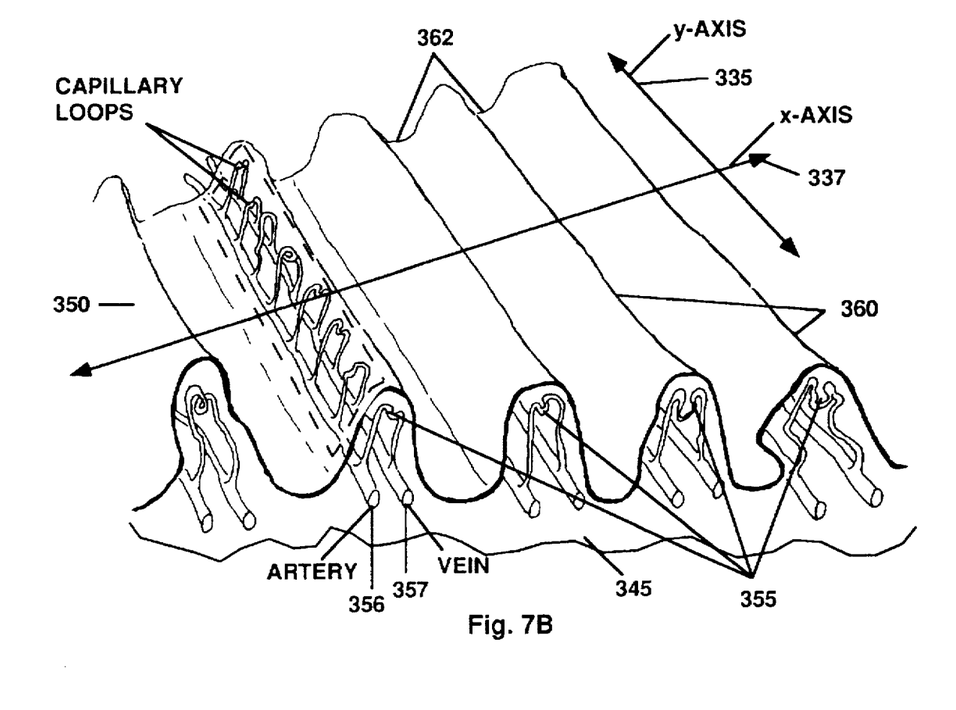
Figure 8:
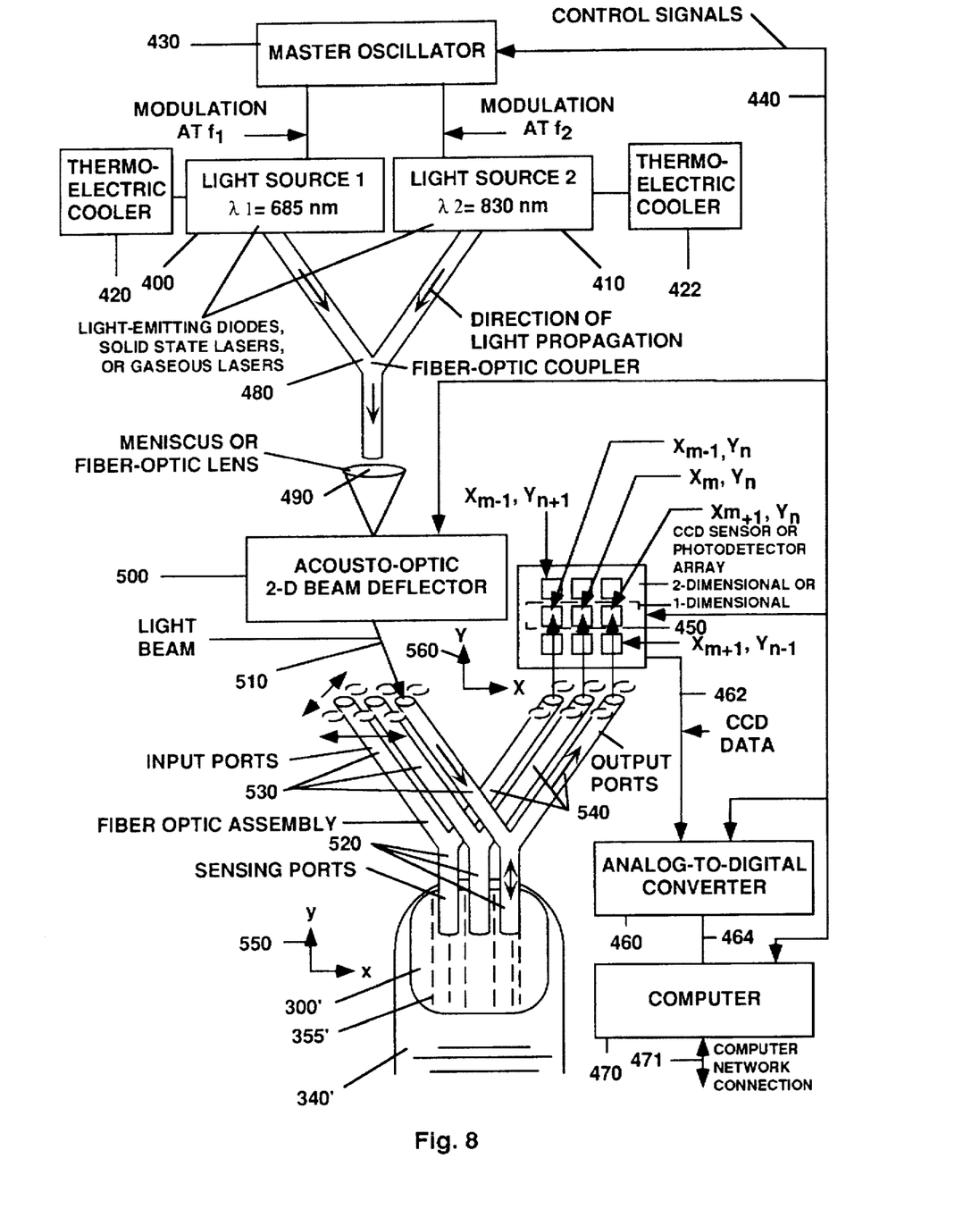
FIG. 8 is a schematic block diagram of a preferred embodiment of the present system.

FIG. 1—Prior Art
  10—Camera
  20—Pictorial data
  30—Computer
FIG. 2—Prior Art
  40—Microphone
  45—Subject
  50—Sound waves
  60—Computer
FIG. 3—Prior Art
  70—Finger
  80—Scanner
  90—Computer
FIG. 4—Prior Art
  100—Photograph
  110—Fingerprint
  120—Camera
  150—Computer
FIG. 5—Prior Art
  160—Sample
  170—Chemical process
  180—Electrophoresis gel
  190—Scanner
  200—Computer
FIG. 6—Prior Art
  210—Scanner
  220—Retina
  225—Eye
  230—Computer
FIGS. 7A and 7B—Anatomy of a Fingernail
  300—Fingernail
  310—Specialized cells
  320—Growth plate
  330—Cuticle
  335—y-axis
  337—x-axis
  340—Finger
  345—Fleshy surface
  350—Nail bed
  355—Capillary loops
  356—Artery
  357—Vein
  360—Arched portion of nail bed
  362—Valley portions of nail bed
FIG. 8—Preferred Embodiment of the Present System
  300'—Fingernail
  355'—Capillary loops
  340'—Finger
  362'—Valley portions of nail bed
  400—Light source 1
  410—Light source 2
  420—Thermoelectric cooler
  422—Thermoelectric cooler
  430—Master oscillator
  440—Multiple signal and control lines
  450—CCD or photodiode array sensor
  460—Analog-to-digital converter
  462—Signal lines
  464—Signal lines
  470—Computer
  471—Computer network connection
  480—Fiber-optic coupler 490—Lens
500—Acousto-optic, 2-dimensional beam deflector
510—Light beam
520—Sensing ports
530—Input ports
540—Output ports
550—Cartesian coordinate axes associated with finger 340'
560—Cartesian coordinate axes associated with CCD sensor 450

Figure 9A:
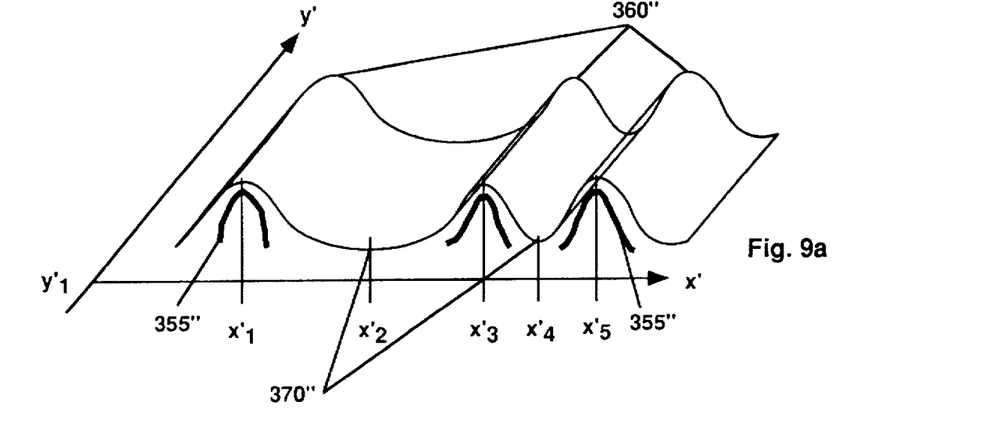
FIG. 9a is a graphical representation of the unique signature of a subject's nail bed.
Figure 9B:
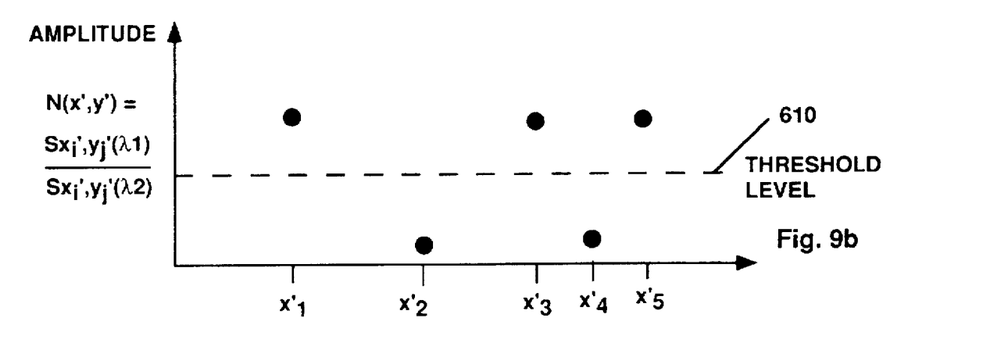
FIG. 9b shows the amplitude of signals stored at various $x'_n$ locations.
Figure 9C:
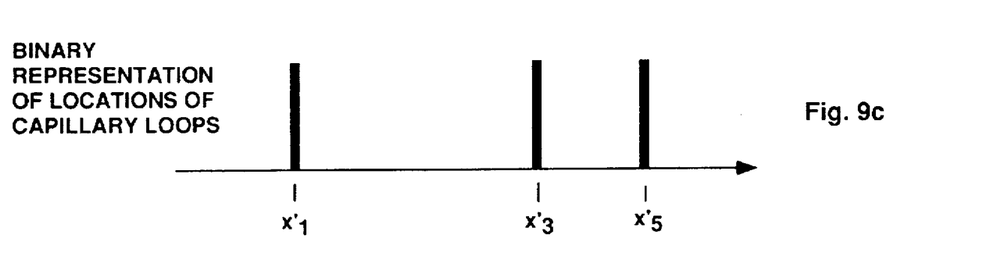
Figure 10A:
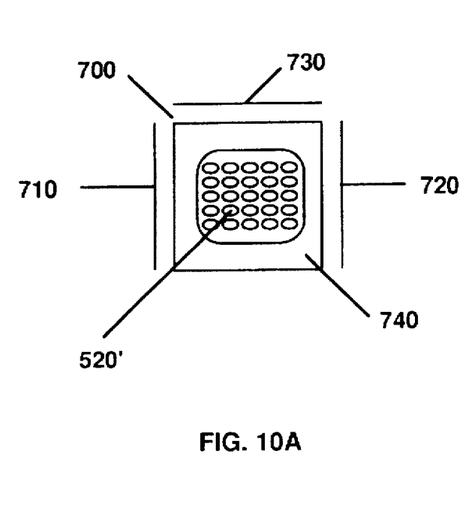
FIGS. 10A and 10B are front and side views, respectively, of a preferred embodiment of the present system.
Figure 10B:
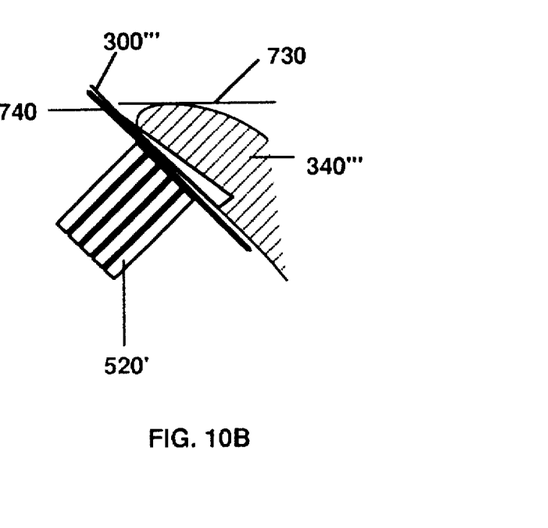
Figure 11A:
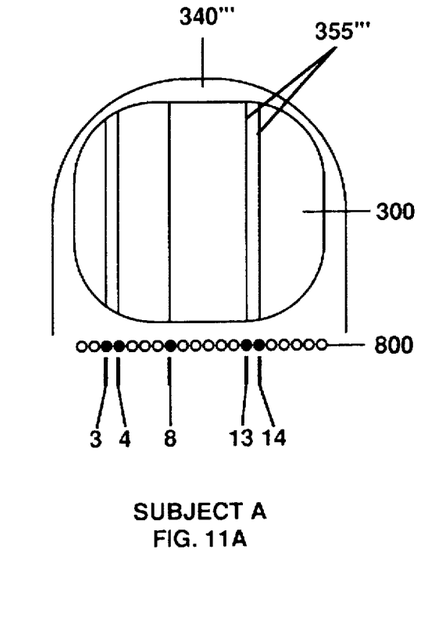
FIG. 11A shows the fingernail of a first subject and the data which uniquely identifies this subject.
Figure 11B:
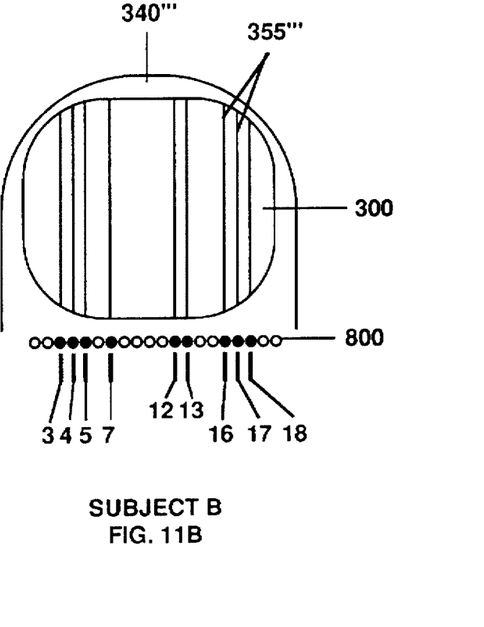
FIG. 11B shows the fingernail of a second subject and the data which uniquely identifies this subject.

FIGS. 9A, 9B, and 9C—Graphical Analysis of the Data
355"—Capillary loops
360"—Nail bed arches
370"—Nail bed valleys
610—Threshold level FIGS. 10A and 10B—Preferred Embodiment of the Present System
300'"—Fingernail
340'"—Finger
520'—Sensing ports
700—Chamber
710—Left-hand planar segment
720—Right-hand planar segment
730—Top planar segment
740—Planar segment containing terminuses of sensing ports FIGS. 11A and 11B—Fingernails of Subjects A and B
300""—Fingernail
340""—Finger
355""—Capillary loops
800—Binary representation of locations of capillary loops, after analysis Anatomy of the Fingernail and Nail bed—FIGS. 7A and 7B As shown in FIG. 7A, a human fingernail 300, at the terminus of finger 340 results from the continued regeneration of specialized cells 310 that are pushed out from a growth plate 320 in the direction of y-axis 335. Growth plate 320 lies beneath cuticle 330, at the base of nail 300. Cells 310 comprise primarily the protein keratin, which in nail 300 comprises a hard, flattened, translucent, horny material. As more cells 310 emerge from growth plate 320, fingernail 300 grows and migrates away from cuticle 330 toward the distal end of finger 340. Fingernail 300 grows on top of a nail bed 350. Nail bed 350 rests on a lower, fleshy surface 345. Nail bed 350 is a grooved structure comprising nearly parallel and irregularly separated columns of toughened, blood-perfused flesh extending parallel to y-axis 335.

FIG. 7B shows an enlarged portion of nail bed 350. It has arched portions or lands 360 which contain a large number of capillary loops 355. Loops 355 carry blood between arteries 356 and veins 357, upward and away from a lower, fleshy surface 345 and relatively nearer to the exterior surface of nail 300. Arched portions or lands 360 of nail bed 350 containing loops 355 are separated by grooves or valleys 362, which have varying widths. Valleys 362 lie generally perpendicular to the direction of x-axis 337.

The width, height, and distance between the parallel columns comprising arches 360 and valleys 362 vary with the age and the size of the individual. The width of these columns varies from 0.13 to 0.25 mm (0.005 to 0.01 inch, respectively). The spacings from groove to groove remain proportionally constant over the entire life of the individual, in similar fashion to the loops and whorls of a fingerprint. Thus, unlike facial characteristics, these spacings can be used to identify and distinguish an individual over his or her entire lifetime.

Fingernail Identification System, Preferred Embodiment—FIG. 8.—Overview

The nail bed structures described supra are different for every individual. Therefore the physical and dimensional characteristics of the interface between nail bed 350 and the underside of nail 310 can be employed to uniquely identify individuals. A preferred embodiment of the present system for analyzing and quantifying the nail bed structure is shown schematically in FIG. 8.

In this embodiment, a pair of highly monochromatic light sources 400 and 410 are preferably Light Emitting Diodes (LEDs) or lasers. Sources 400 and 410 may be cooled by thermoelectric coolers 420 and 422. Sources 400 and 410 emit two different and distinct wavelengths of light, preferably $\lambda 1=685$ nanometers (nm) and $\lambda 2=830$ nm, respectively. Sources 400 and 410 are both "ON" or active at the same time and are modulated at two different frequencies, typically 100 Hz and 200 Hz, by the respective outputs of a master oscillator 430. This modulation is typically sinusoidal, although other waveforms can be used.

Oscillator 430 also provides synchronized control signals on multiple lines 440 to an acousto-optic, 2-dimensional (2-D) beam deflector 500, a photodiode array-CCD sensor 450, an Analog-to-Digital Converter (ADC) 460, and a computer 470. Computer 470 may be connected to a computer network connection 471. If desirable, computer 470 may communicate with other computers in well-known fashion.

Light from sources 400 and 410 passes through fiber optic coupler 480, lens 490—preferably of the type "graded index" lens—, and acousto-optic beam deflector 500. The resulting, exit light beam 510 is directed into a fingernail 300' by a collection of optical fibers comprising sensing port 520. Only one fiber is illuminated at a time. Although only three optical fibers are shown lying in one row in port 520, it is preferred that there be at least twenty per row and at least twenty rows, comprising an area scanning array.

Deflector 500 preferably delivers the admixed wavelengths, $\lambda 1$ and $\lambda 2$ described supra, to one of fibers or input ports 530 at a time. The fiber illuminated by beam 510 is said to be the "illuminated" fiber. Light thus travels from beam deflector 500 through the top, left-hand arm 530 of fiber optic sensing port 520. This light continues downward and exits the illuminated fiber of illuminating and sensing port 520, striking nail 300'. Nail 300' is typically the subject's index fingernail. Light impinging on nail 300' is then absorbed in and reflected from nail 300' and its associated nail bed 350 (FIGS. 7A and 7B) in the manner described infra. Light reflected upward from nail 300' and nail bed 350 (FIGS. 7A and 7B) enters the bottom end of the illuminating sensing port 520. A fraction of the light travels up the right-hand arm or output port 540 of port 520, exiting at the surface of CCD sensor 450. A portion of the reflected light also travels up the left-hand arm 530 of port 520. This portion of light is lost. The fibers in arms or ports 530 and 540 of port 520 are typically 20 to 100 microns in diameter and one to 10 centimeters in length.

A portion of the light from port 520 is reflected from the surface of nail 300'. The remainder of the light passes through nail 300' and is reflected from and scattered within the surface of capillary loops 355 (FIGS. 7A and 7B). Light from source 400, preferably with a wavelength of 685 nm, is largely absorbed by hemoglobin in the blood contained in capillary loops 355'. Loops 355' channel the flow of blood (not shown) between arteries 356 and veins 357 within nail bed 350 (FIGS. 7A and 7B). Light from source 410, preferably with a wavelength of 830 nm, is highly scattered in the presence of the blood cells contained in capillary structures 355 (FIGS. 7A and 7B).

The light of both wavelengths is reflected back through nail 300' and into fibers 520. The ratio of the intensities of this light will depend upon the relative proximity of capillary loops beneath each of the fibers comprising port 520. For example, if the leftmost fiber of port 520 is located directly over one or more capillary loops 355', then the intensity of reflected light at 685 nanometers compared to that of light at 830 nm will have one particular value.

On the other hand, if a central fiber of port 520 is located over a space or valley 362 between loops 355', then the intensity of reflected light at 685 nanometers compared to that of the light at 830 nm will have a lower value. The intermediate case is shown under the rightmost fiber of port 520. It is this difference in light intensity ratios of wavelengths $\lambda 1$ and $\lambda 2$ as a function of position which is quantified in the present system.

Light leaving nail 300' enters the illuminated fiber of port 520 and a portion of this light energy is guided into the illuminated member of fibers 540. The distal ends of fibers 540 are optically and mechanically coupled directly to the photodetector elements of area-type Charge-Coupled Device (CCD) sensor 450. One such typical CCD photodetector assembly is the model KAI-1000, manufactured by the Eastman Kodak Company, in Rochester, N.Y., U.S.A. This device contains over one million photodetectors in a plane. Each photodetector is 9 microns square.

In normal CCD operation, light is allowed to fall on each picture element (pixel) of a CCD for a period of time known as the "integration" time or period. This integration time can be compared to the duration of shutter opening in an ordinary, film camera. During this time, photons leaving fibers 540 create charge carriers which are temporarily stored in each pixel region on the CCD, in well-known fashion. At the end of the integration time, all the charge is "read out" from the CCD, one pixel at a time. Signals from CCD 450 are serially presented to the input of ADC 460 via connecting line or lines 362. They are then digitized and a number, representative of the integrated light intensity is presented to the memory of computer 470 via connecting lines 464. One or more pixels on CCD 450 will be illuminated by each of fibers 540. Signals associated with each pixel or group of pixels can be referred to a particular spatial location in the array of fibers 540 and hence in the array of fibers in port 520. The light from each pixel is thus quantified and stored in a particular location in the memory of computer 470. Electronic readout of the signals from CCD sensors is well understood by those familiar with the art of imaging devices and shall not be described in detail here. The Cartesian coordinate axes 560 of the array of fibers in port 520 and the photodetectors on CCD 450 are precisely aligned during manufacture of the assembly.

The integration period of CCD 450 is arranged to be very short compared with the modulation period, typically 0.01 to 0.05 second, of light sources 400 and 410. Moreover, the readout of CCD 450 is coordinated by master oscillator 430 with the modulation of light sources 400 and 410 and the beam positioning by acousto-optic beam deflector 500. Because of this, it is possible to collect two sets of data which can be associated with each of the fibers in port 520. One set is representative of the intensity of light of wavelength 685 nm at each position. The other set is representative of the intensity of light of wavelength 830 nm at each position. After all the individual data at both wavelengths are taken, the above-described intensity ratio can be digitized and stored in the memory (not shown) of computer 470 for each of the fibers in port 520.

CCD Data Acquisition Summary

Reflected light at wavelengths 680 nm ($\lambda 1$) and 830 nm ($\lambda 2$) impinges on CCD sensor 450 at the location of each fiber 540. The integrated intensity value (number of photons) of the light is converted to an electrical signal, typically a voltage at an output connection of sensor 450. In order to conserve output connections, sensor 450 is typically arranged to present the outputs of individual pixels serially, in a row-column fashion. At the end of this integration time, the voltage associated with the number of photons contained in pixel X1, Y1 will be presented at the output of sensor 450, converted to a digital signal by an analog-to-digital converter, and stored in the memory of computer 470. Next, pixel X2, Y1 is digitized and stored. This process continues until all photodetector elements of sensor 450 have been read out, digitized, and stored. This process is completed for both wavelengths $\lambda 1$ and $\lambda 2$.

Data Analysis

The following data analysis is preferably accomplished by computer 470. This computer is preferably an ordinary personal computer such as the PC 330, sold by International Business Machines (IBM) of Armonk, N.Y., U.S.A. This computer contains 8 megabytes of Random Access Memory (RAM), a floppy disk drive, and a 540 megabyte hard disk drive. This computer may be connected to other computers via a computer network, in well-known fashion. A fingerprint computer is analogous to the preferred computer, although more memory and storage may be required to properly analyze fingerprints. Algorithms written to solve the equations below are well-known to those skilled in the art of scientific computer programming. These algorithms are not discussed in detail here.

Angular Correction

In general, each time the individual's finger 340' is scanned, it is likely that it will be oriented at a different angle in the plane formed by axes 550. Therefore the data must first be corrected for angular misalignment between the longitudinal axis (not shown) of finger 340' and the y-axis of the array formed by the fibers in port 520. These fibers are oriented such that the y-axis of the individual's finger is presented in a direction only nearly parallel to the y-axis 560 of CCD 450. Misalignment between the two y-axes is corrected as follows.

The digitized signals at any pixel location are $S_{Xi,Yj}(\lambda 1)$ and $S_{Xi,Yj}(\lambda 2)$, where $\lambda 1$ and $\lambda 2$ have been defined supra. Xi, Yj denotes any pixel location on CCD sensor 450 which is illuminated by one of the fibers in port 540 associated with the respective fibers in port 520. The normalizing ratio $N_{Xi,Yj}$, for i=1 to M and j=1 to M is defined as follows:

$$N_{Xi,Yj} = S_{Xi,Yj}(\lambda 1)/S_{Xi,Yj}(\lambda 2). \tag{1}$$

Elements $N_{X1,Y1}, N_{X1,Y2} \ldots N_{Xi,YM}$ form a matrix N(x,y) which is a function of discrete pixel coordinates on CCD 450.

Assume that the X-Y axis of CCD 450 (X,Y) is misaligned with respect to the image of the x-y axis (x,y) of nail bed structure 350 (FIGS. 7A and 7B) and that the two axes are oriented at an angle $\phi$ with respect to each other. It is necessary to rotate reference system coordinates X-Y to new system coordinates x', y' in order to compensate for alignment error. This rotation can be described as follows. Coordinates x' and y' are first resolved into their components in the X, Y plane. Thus $$X = x' \cos \phi + y' \sin \phi,$$

and $$Y = x' \sin \phi + y' \cos \phi. \tag{2}$$

Substituting Eq. 2 into Eq. 1 yields $$N(x40, y') = N\{x' \cos \phi + y' \cos \phi - x' \sin \phi + y' \cos \phi\}. \tag{3}$$

The values of $N(x',y')$ are quasi-periodic in the x-direction, the direction perpendicular to the longitudinal axis of finger 340. In the y-direction, parallel to the longitudinal axis of finger 340', values of $N(x',y')$ are constant. Thus the alignment error $\phi$ can be determined from the following derivative equation:

$$\frac{d}{dy'} N(x',y') = 0. \tag{4}$$

Solving Eq. 4 yields the correct value for $\phi$. Substituting the value thus found for $\phi$ into Eq. 3 yields the corrected value for $N(x',y')$.

Data Reduction

The next step in the analysis is the averaging values of $N(x',y')$ along the y' axis for each value of x'. It is not necessary to resolve structural information along y-axis 335 (FIGS. 7A and 7B); only the signal average is required. However it is necessary to properly resolve peak-to-valley distances along x-axis 337 (FIGS. 7A and 7B). Performing this average, while recognizing that the grooves are parallel yields a one-dimensional value for $N(x',y')$. Hence $$N(x',y') = N_{Average}(x'). \tag{5}$$

The numbers comprising the one-dimensional matrix of output data in Eq. 5 are a mathematical representation of the periodic structure of nail bed 350 (FIG. 7A) and represent the desired, unique identification of an individual.

Graphical Description of Data Analysis—FIG. 9

FIG. 9a shows a perspective view of arches 360" and valleys 362" of nail bed 350 (FIGS. 7A and 7B). The positions of blood-containing capillary loops 355 (FIG. 7B) are shown underneath these structures at $x'_1$, $x'_2$, and so forth. Nail 300 (FIG. 7, not shown in FIG. 9) lies above these structures.

FIG. 9b shows the corresponding amplitude of the ratio $N(x',y')$ of signals digitized and stored at each $x'_n$ location, and averaged along the y' direction, as described supra.

If a threshold level 610 is established in the data reduction algorithm employed by computer 470 (FIG. 8), then signals which have amplitude greater than this level can be said to be a logical "1" or Boolean TRUE. Signals which have amplitude less than this level can be said to be a logical "0" or Boolean FALSE. This permits a binary representation of the location of the loops 360 (FIG. 7) and their relative locations $x'_n$, as shown in FIG. 9c. This representation is the end point of the data reduction wherein a binary data set uniquely identifies an individual by the presence and spacings of loops 355 (FIG. 7B) in the individual's nail bed.

Operation of the Preferred Embodiment—FIGS. 10A, 10B, 11A and 11B.

One arrangement of the preferred embodiment is shown in FIGS. 10A and 10B. In use, the person inserts a finger 340'", preferably an index finger into a chamber 700, as shown. Chamber 700 comprises planar segments 710, 720, 730, and 740 constrains the individual's finger 340'" to lie one orientation. Sensing ports 520' are perpendicular to and terminate in plane 740. In this embodiment, finger 340'" is "upside-down", with fingernail 300'" pressing comfortably against planes 730 and 740; which are preferably oriented at an angle of 45 degrees to force the nail of the inserted finger against segment 740. A gap between segments 730 and 740 permits insertion of a finger 340'" with a long fingernail 300'". Chamber 700 and the array of sensing fibers in port 520' have width equal to or greater than the largest finger which is to be scanned. For simplicity, only twenty-five fibers comprising port 520' are shown in FIG. 10A. As mentioned supra, the preferred embodiment contains many more. After finger 340'" is properly inserted into chamber 700, a sensor (not shown) or an operator (not shown) initiates a scan of fingernail 300 and nailbed 350 (FIGS. 7A and 7B), in the manner described supra. Master oscillator 430 (FIG. 8) turns light sources 400 and 410 "ON". Beam deflector 500 causes the combined light from sources 400 and 410 to illuminate the first fiber in multiple-fiber sensing port 520. This combined light illuminates one discrete portion of nail 300"". Sensing port 520 also receives reflected light from the same location in nailbed 340 (FIGS. 7A and 7B) and transmits this light to Sensor array 450. Sensor array 450 detects light from the first-illuminated fiber and stores electrical charge at that fiber's location. The amount of charge stored is proportional to the intensity and duration of the detected light. Deflector 500 now causes the combined light from sources 400 and 410 to illuminate the second fiber in port 520. Light from the second fiber illuminates a second, discrete portion of nail 300"". Light reflected from this location is stored at a second location in sensor array 450, and so forth until all fibers in fiber port array 520 have been illuminated and their respective data stored in sensor 450. After all fibers have been scanned, master oscillator 430 causes analog-to-digital converter 460 to digitize the data from each position in sensor array 450. These digitized data are stored in computer 470 for subsequent analysis.

Two different fingernails are shown in FIGS. 11A and 11B. One is the index fingernail of Subject A (FIG. 11A) and the other is the index fingernail of Subject B (FIG. 11B). The locations of capillary loops 355'" are shown as lines.

As described supra, columnar data from sensor 340 (FIG. 8) are averaged to provide a single row of data. The positions of fibers in port 520" are shown as rows 800. After thresholding of the data, each position along row 800 contains either a "1" or a "0", or a Boolean TRUE or FALSE. These binary values indicate the presence or absence of a loop 355'" at that position. Thus the identity of Subject A comprises the number string 3, 4, 8, 13, and 14 since these are the indicated positions of loops 355'". It can be seen that the identity of Subject B comprises the number string 3, 4, 5, 7, 12, 13, 16, 17, and 18.

Each scan reduces the data thus obtained from each person's fingernail to an unique number string. This string contains one or more numbers representative of the averaged positions of the capillary loops in that person's fingernail. These number strings are stored in the memory of computer 470 (FIG. 8). Each time a subject's fingernail is scanned, computer 470 can do any of several tasks with the data: it can disregard the data, store the data, or compare the data with all other previously stored number strings, using well-known comparison techniques.

Summary, Ramifications, and Scope

It is thus seen that the present system provides a way to unambiguously identify individuals, preferably by optically scanning their fingernail beds at a plurality of known positions, the illumination being provided at two discrete wavelengths.

Although the preferred embodiment has been described for use with fingernails, other body structures can be used with equal effectiveness. Toenails and locations on the individual's skin can provide useful data similar to that obtained from fingernails. Light of other wavelengths can be used, as well as light from more than two sources. Instead of an acousto-optical scanner, a galvanometer-type scanner can be used. Instead of an area CCD sensor, another type of sensor, such as a television camera electron tube, a photodiode array, or a mechanically scanned linear CCD sensor can be used. In certain cases such as the television camera tube, a lens may be required to image the ends of the sensor fibers onto the photodetector plane. More or less data representative of a person's nail bed can be saved. Instead of a binary condition, the data can be saved as multi-bit, digital bytes or as analog information. Instead of using the master oscillator to control the system, the computer can control the operation of the entire system. Rather than using the absolute row numbers to comprise the identifying number string, a differencing method can be used. In this method, the position of the first capillary loop is regarded as the datum for subsequent "TRUE" row locations. Instead of absolute identification of an individual, a partial match between a stored identity and a new identity can be statistically analyzed. This analysis provides an identity which is qualified as to a statistical level of confidence.

While the present system employs elements which are well known to those skilled in the separate arts of optics, signal analysis and electronics, it combines elements from these fields in a novel way which produces a new result not heretofore discovered.

Accordingly the scope of this invention should be determined, not by the embodiments illustrated, but by the appended claims and their legal equivalents.

We claim:

1. A system for determining the identity of an individual, comprising:
   a. a plurality of light sources providing a corresponding plurality of beams of light,
   b. a modulator for modulating the amplitudes of said light sources at a plurality of respective frequencies,
   c. lens means for focusing said beams of light,
   d. coupling means for coupling said light beams from said sources to said lens means,
   e. an input port means,
   f. light beam deflection means for deflecting said beams of said light in a grid pattern to illuminate a discrete portion of said input port means,
   g. an output port means,
   h. sensing port means coupled to said input port means and said output port means for illuminating a discrete portion of said individual with said beams of light and sensing a corresponding plurality of beams of said light reflected from said discrete portion of said individual,
   i. photodetector sensing means for sensing the amplitudes of said beams of said reflected light,
   j. analog-to-digital converter means for converting the output of said photodetector sensing means to digital representations of said amplitudes, and
   k. computer means for storing the results of said digital representations of said amplitudes in a form which uniquely identifies said individual.

2. The system of claim 1 wherein said sources of said light sources comprise a plurality of light-emitting diodes.

3. The system of claim 1 wherein said sources of said light sources comprise a plurality of lasers.

4. The system of claim 3 wherein said lasers are solid-state lasers.

5. The system of claim 3 wherein said lasers are gaseous lasers.

6. The system of claim 1 wherein said coupling means are optical fibers.

7. The system of claim 1 wherein said lens means comprise a fiber-optic lens.

8. The system of claim 1 wherein said input means, said output means, and said sensing port means comprise optical fibers.

9. The system of claim 1 wherein said photodetector sensing means are selected from the group consisting of charge-coupled devices, television camera electron tubes, and photodiode arrays.

10. The system of claim 9, further including means for moving said photodetector sensing means relative to said individual.

11. The system of claim 9 wherein said photodetector sensing means comprise a two-dimensional array of photodetector elements.

12. The system of claim 9 wherein said photodetector sensing means comprise a one-dimensional array of photodetector elements.

13. A method for uniquely identifying individuals, comprising:
   selectively illuminating a nailbed of either a fingernail or a toenail of a body of an individual, said illuminating provided by plural light sources having respectively plural distinct wavelengths;
   detecting said plural distinct wavelengths of reflected light from said successive discrete portions of said portion of a body of said individual with a photodetector means said photodetector means converting and combining said reflected light of plural distinct wavelengths to a corresponding plurality of varying amplitude signals based on the intensities of said plural distinct wavelengths of reflected light at the output of said photodetector means;
   converting by receiving said plurality of varying amplitude signals from said plurality of outputs of said photodetector means to a corresponding plurality of binary digital representations for computational analysis;
   analyzing said binary digital representations to generate a ratio of said varying amplitude signals of respective plural distinct wavelengths, and presenting a unique binary result indicative of the identity of said individual.

14. The method of claim 13 wherein said individual is an unknown individual and said results for said unknown individual are compared with said results for a known individual.

15. A system for determining the identity of an individual by illuminating a nailbed of either a fingernail or a toenail, comprising:
   a. a plurality of light sources emitting respectively different wavelengths providing a corresponding plurality of beams of light for illuminating said nailbed of said individual;
   b. an oscillator for modulating the amplitude of said light sources, and providing a first plurality of control signals for controlling the operation of said system;
   c. a lens;
   d. a fiber-optic coupler for coupling light from said light sources to said lens;

e. a two-dimensional beam deflector;

f. a photodetector array means for detecting said plural light beams of different wavelengths, said photodetector array means providing respectively a series of varying amplitude signals from said respective different wavelengths of said plural light beams;

g. a fiber-optic sensing port coupled with said lens and said photodetector array means, said sensing port both illuminating and receiving reflected light from said discrete portion of said body of said individual;

h. an analog-to-digital converter connected to said photo detector array means for receiving said series of varying amplitude signals and converting them into digital data representing said illuminated discrete body portion; and i. a computer for receiving said data from said analog-to-digital converter and generating an analysis derived from a ratio of said varying amplitude signals of said respective different wavelengths to provide a unique binary result indicative of the identity of said individual.

16. The system of claim 15 wherein said computer is arranged to analyze, store, and present in humanly sensible form data obtained from said analog-to-digital converter.

17. The system of claim 15 wherein said computer is arranged to analyze, store and present data obtained from said analog-to-digital converter, and said computer also provides a second plurality of control signals to control said analog-to-digital converter, said photodetector array, said two-dimensional beam deflector, and said oscillator.

18. The system of claim 15 wherein said computer is connected to a computer network.

* * * * *